United States Patent
Islam et al.

(10) Patent No.: US 10,674,542 B2
(45) Date of Patent: *Jun. 2, 2020

(54) RACH COMBINING ACROSS MULTIPLE ATTEMPTS

(71) Applicant: QUALCOMM Incorporated, San Diego, CA (US)

(72) Inventors: Muhammad Nazmul Islam, Edison, NJ (US); Junyi Li, Chester, NJ (US); Sundar Subramanian, Bridgewater, NJ (US); Juergen Cezanne, Ocean Township, NJ (US); Navid Abedini, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/360,181

(22) Filed: Nov. 23, 2016

(65) Prior Publication Data
US 2017/0347380 A1    Nov. 30, 2017

Related U.S. Application Data

(60) Provisional application No. 62/343,415, filed on May 31, 2016.

(51) Int. Cl.
*H04L 12/28* (2006.01)
*H04W 74/08* (2009.01)
(Continued)

(52) U.S. Cl.
CPC ...... *H04W 74/0833* (2013.01); *H04B 7/0408* (2013.01); *H04L 5/0048* (2013.01);
(Continued)

(58) Field of Classification Search
CPC ...................................................... H04L 12/28
(Continued)

(56) References Cited

U.S. PATENT DOCUMENTS 9,363,829 B2    6/2016  Di et al.
2011/0280169 A1*  11/2011  Seo .................. H04W 52/146
                                                370/311

(Continued)

FOREIGN PATENT DOCUMENTS

WO    2016086144 A1    6/2016

OTHER PUBLICATIONS

Fujitsu: "The impacts on RAR caused by preamble repetition," 3GPP Draft; R1-151565—The Impacts on Rar Caused by Preamble Repetition—Final, 3rd Generation Partnership Project (3GPP), Mobile Competence Centre ; 650t Route Des Lucioles ; F-06921 Sophia-Antipolis C, vol. RAN WG1t No. Belgrade, Serbia; 20150420-20150424 Apr. 19, 2015 (Apr. 19, 2015), XP050934437, Retrieved from the Internet: URL:http://www.3gpp.org/ftp/Meetings_3GPP_SYNC/RAN1/Docs/ - - [retrieved on Apr. 19, 2015] Section 2, 3 pages.

(Continued)

*Primary Examiner* — Dang T Ton
(74) *Attorney, Agent, or Firm* — Arent Fox LLP

(57) ABSTRACT

A mechanism is proposed to reduce overhead at the expense of increasing latency for UEs with weak link gain, while the latency for most UEs may remain the same. In one aspect of this disclosure, a UE may determine the number of attempts for transmitting a RACH signal based on one or more of path loss, the transmit power of the UE, the beam correspondence at the UE, or the power of signals received during the synchronization subframe. The UE may transmit the RACH signal in the determined number of attempts. In another aspect of the disclosure, a base station may combine signals (Continued)

of one or more RACH attempts to decode a RACH signal. The base station may inform a UE regarding the number of RACH subframes that the base station uses for decoding the RACH signal through a random access response message.

25 Claims, 16 Drawing Sheets

(51) Int. Cl.
| | |
|---|---|
| *H04W 52/36* | (2009.01) |
| *H04W 52/42* | (2009.01) |
| *H04B 7/0408* | (2017.01) |
| *H04L 5/00* | (2006.01) |
| *H04W 24/10* | (2009.01) |
| *H04W 52/18* | (2009.01) |
| *H04W 56/00* | (2009.01) |
| *H04W 52/24* | (2009.01) |
| *H04B 7/08* | (2006.01) |
| *H04W 72/04* | (2009.01) |
| *H04W 52/00* | (2009.01) |
| *H04B 7/02* | (2018.01) |
| *H04B 1/04* | (2006.01) |

(52) U.S. Cl.
CPC ........... *H04W 24/10* (2013.01); *H04W 52/18* (2013.01); *H04W 52/242* (2013.01); *H04W 52/245* (2013.01); *H04W 52/246* (2013.01); *H04W 52/365* (2013.01); *H04W 52/367* (2013.01); *H04W 52/42* (2013.01); *H04W 56/001* (2013.01); *H04B 7/02* (2013.01); *H04B 7/088* (2013.01); *H04B 2001/0416* (2013.01); *H04W 52/00* (2013.01); *H04W 72/046* (2013.01)

(58) Field of Classification Search
USPC .......................................................... 370/329
See application file for complete search history.

(56) References Cited

U.S. PATENT DOCUMENTS

| | | |
|---|---|---|
| 2014/0233516 A1 | 8/2014 | Chun et al. |
| 2014/0247796 A1 | 9/2014 | Ouchi et al. |
| 2014/0376466 A1 | 12/2014 | Jeong et al. |
| 2015/0341963 A1 | 11/2015 | Futaki et al. |
| 2015/0359005 A1* | 12/2015 | Wong .................... H04W 76/18 370/329 |
| 2016/0044517 A1 | 2/2016 | Raghavan et al. |
| 2016/0119038 A1* | 4/2016 | Thomas ................. H04B 7/043 370/329 |
| 2016/0192399 A1 | 6/2016 | Zhu et al. |
| 2017/0347379 A1 | 11/2017 | Islam et al. |

OTHER PUBLICATIONS

Qualcomm Incorporated: "4-step RACH Procedure Consideration," 3GPP Draft; R1-1700791 4-Step RACH Procedure Consideration, 3rd Generation Partnership Project (3GPP), Mobile Competence Centre ; 650t Route Des Lucioles; F-06921 Sophia-Antipolis Cedex ; France vol. RAN WG1, No. Spokane, USA; 20170116-20170120 Jan. 10, 2017 (Jan. 10, 2017), XP051203106, Retrieved from the Internet: URL:http://www.3gpp.org/ftp/tsg ran/WG1_RL1/TSGR1 AH/NR_AH_1701/Docs/ - - [retrieved on-Jan. 10, 2017] Section 4.2; 11 pages.
Barati C.N., et al., "Directional Initial Access for Millimeter Wave Cellular Systems", IEEE, arXiv:1511.06483v1 [cs.IT] Nov. 20, 2015, Retrieved from internet https://www.researchgate.net/publication/284476514 on Aug. 23, 2016, pp. 1-12.
International Search Report and Written Opinion—PCT/US2017/032725—ISA/EPO—dated Dec. 19, 2017.
Jeong C., et al., "Random Access in Millimeter-Wave Beamforming Cellular Networks: Issues and Approaches", Millimeter-Wave Communications for 5G IEEE Communications Magazine, IEEE Service Center, Piscataway, US, vol. 53, No. 1, Jan. 1, 2015, pp. 180-185, XP011570628, ISSN: 0163-6804, DOI: 10.1109/MCOM.2015.7010532 [retrieved on Jan. 14, 2015].
LG Electronics Inc: "RACH Soft Combining", 3GPP Draft; R1-074979, 3rd Generation Partnership Project (3GPP), Mobile Competence Centre ; 650, Route Des Lucioles ; F-06921 Sophia-Antipolis Cedex ; France, vol. RAN WG1, No. Korea; Nov. 4, 2007, XP050108021, [retrieved on Nov. 4, 2007], 4 pages.

* cited by examiner

RACH COMBINING ACROSS MULTIPLE ATTEMPTS

CROSS-REFERENCE TO RELATED APPLICATION(S)

This application claims the benefit of U.S. Provisional Application Ser. No. 62/343,415, entitled "RACH COMBINING ACROSS MULTIPLE SUBFRAMES" and filed on May 31, 2016, which is expressly incorporated by reference herein in its entirety.

BACKGROUND

Field

The present disclosure relates generally to communication systems, and more particularly, to a random-access channel (RACH).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In millimeter wave (MMW) systems, a directional RACH (DRACH) may be used for initial network access. A base station may sweep across different directions in different time slots and wait to receive a RACH signal from one or more user equipments (UEs). The RACH duration may depend on a UE with the weakest link gain. Thus the overhead for the RACH may be high.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

RACH duration may depend on a UE with the weakest link gain. Thus the overhead for the RACH may be high. In an aspect of the disclosure, a method, a computer-readable medium, and an apparatus are provided to reduce RACH overhead at the expense of increasing latency for UEs with weak link gain, while latency for most UEs may remain the same. The apparatus may be a UE. The apparatus may determine the number of attempts for a transmission of a RACH signal based on one or more of path loss, transmit power of the apparatus, the beam correspondence at the apparatus, or the power of signals received during the synchronization subframe. The apparatus may transmits the RACH signal in the determined number of attempts.

In another aspect of the disclosure, a method, a computer-readable medium, and an apparatus are provided. The apparatus may be a base station. The apparatus may combine signals of one or more RACH attempts to decode a RACH signal. The apparatus may inform a UE regarding the number of RACH attempts used for decoding the RACH signal through a random access response message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
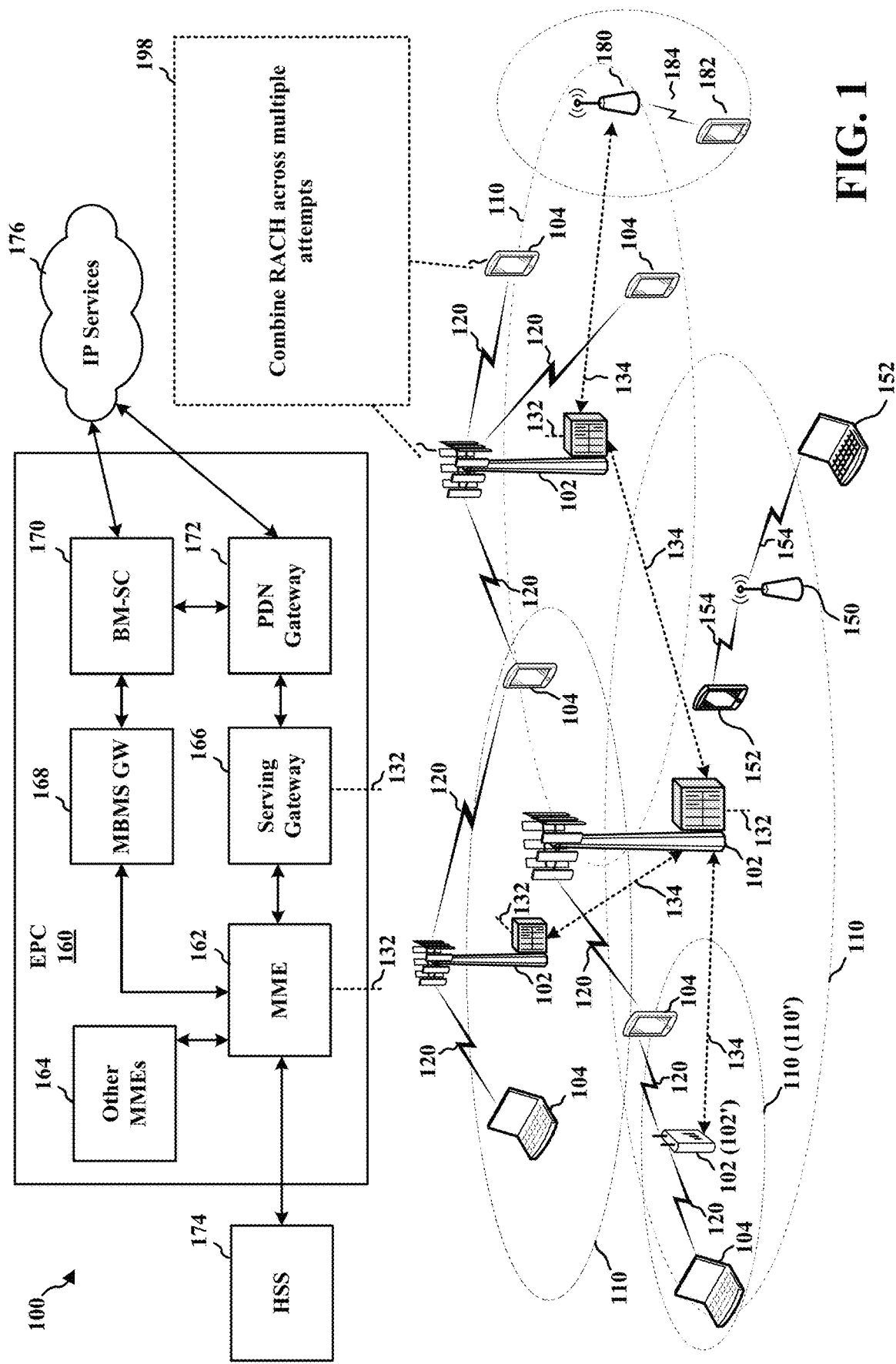
FIG. 1 is a diagram illustrating an example of a wireless communications system and an access network.
Figure 2:
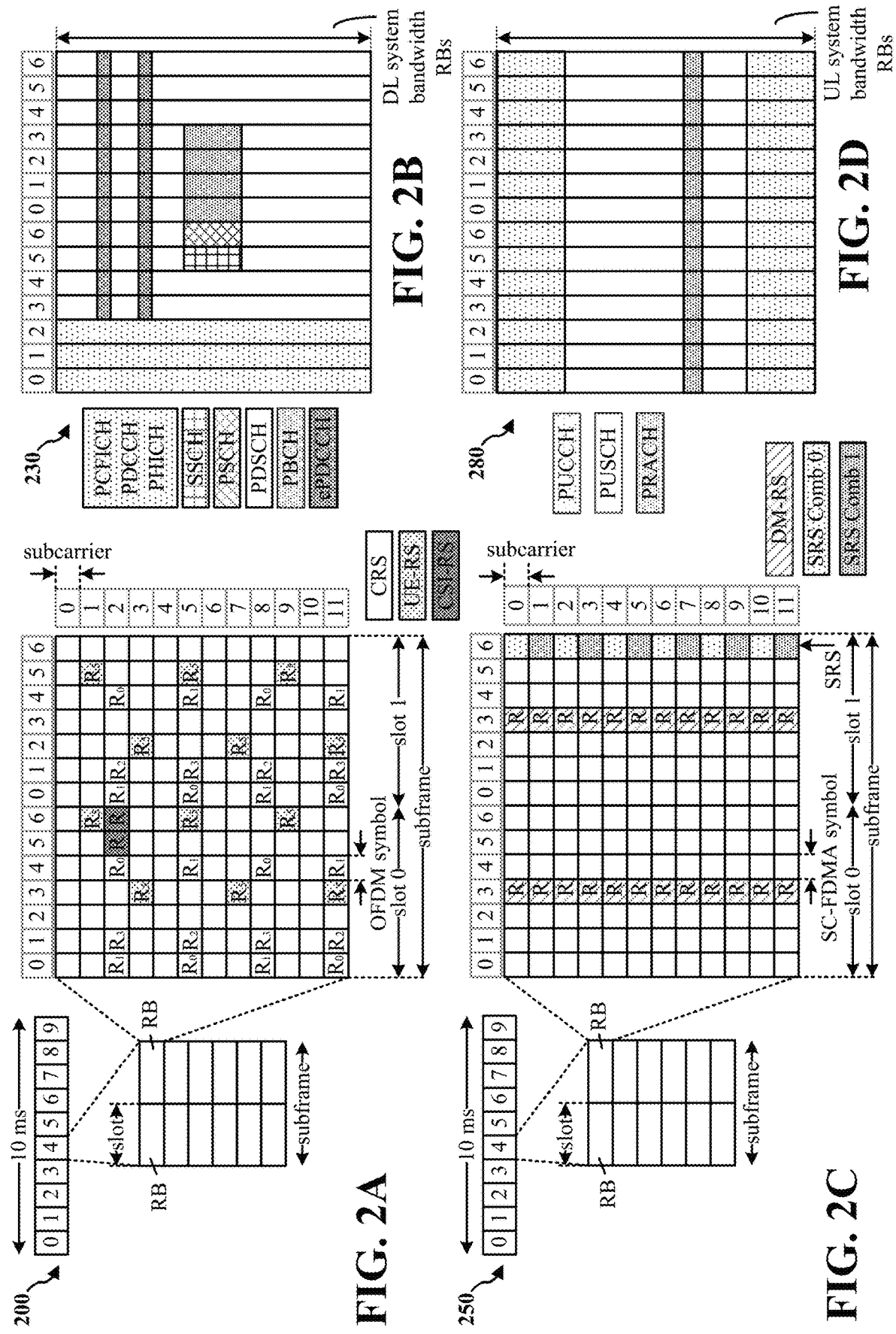
FIGS. 2A, 2B, 2C, and 2D are diagrams illustrating LTE examples of a DL frame structure, DL channels within the DL frame structure, an UL frame structure, and UL channels within the UL frame structure, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to combine (at 198) RACH signals carried by resources across multiple RACH attempts in order to decode a RACH signal. The operations performed at 198 will be further described below with reference to FIGS. 2-16.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
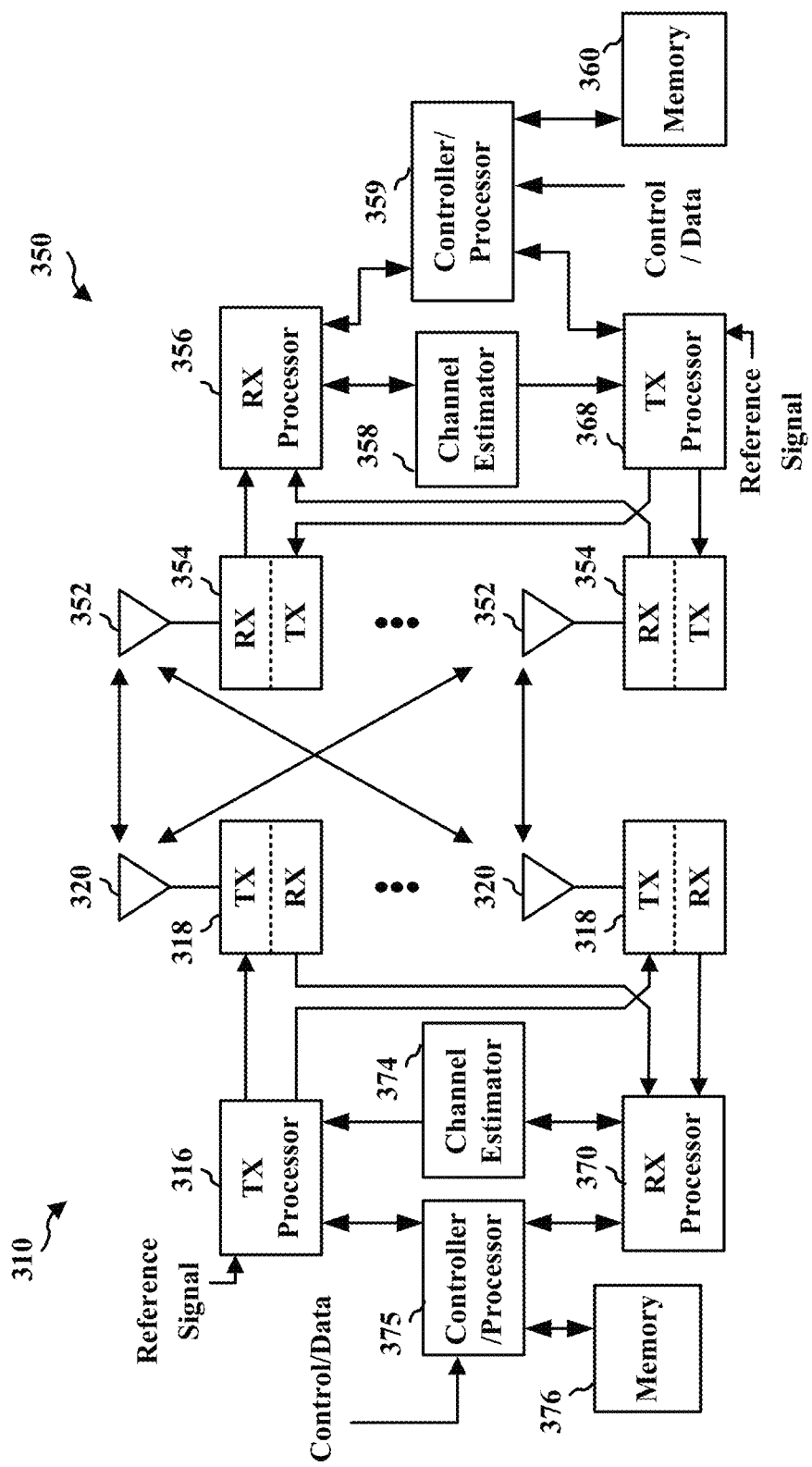
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
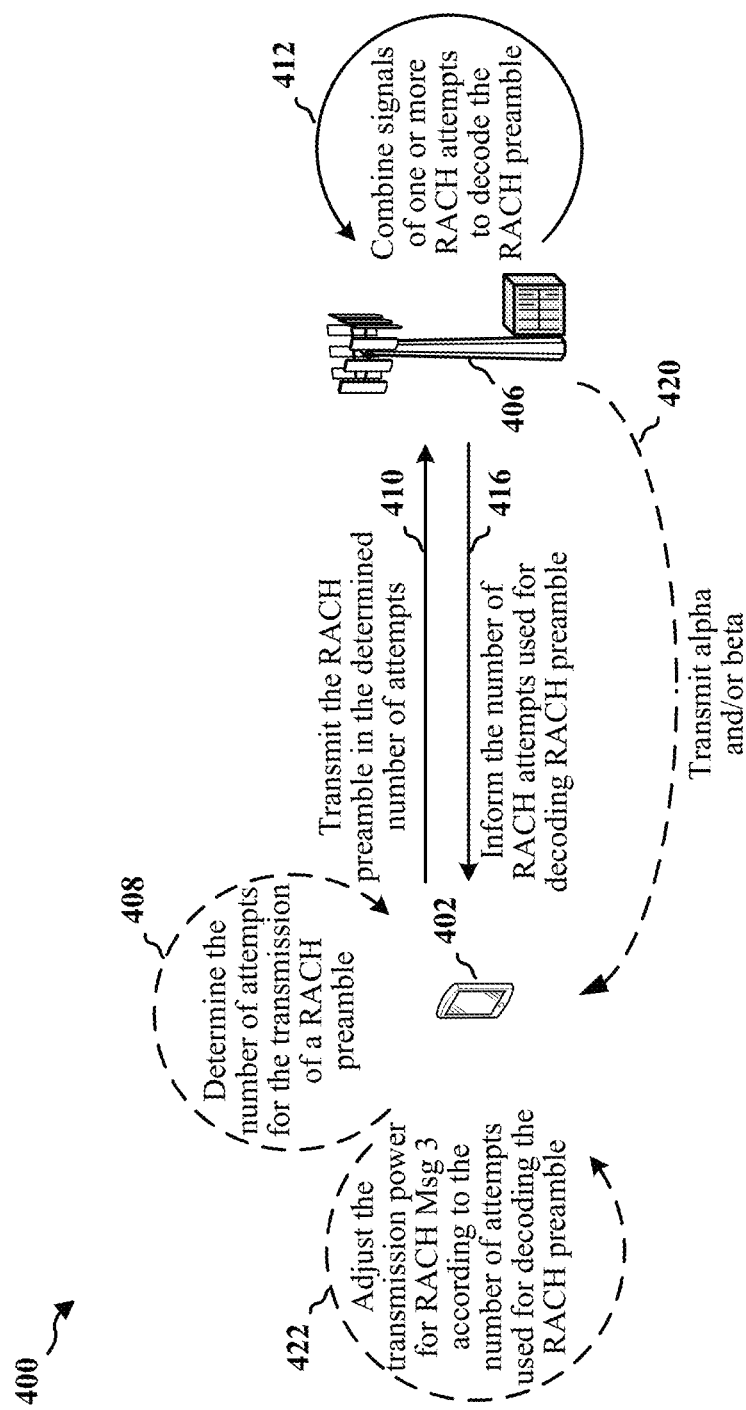
FIG. 4 is a diagram illustrating an example of RACH combining across multiple attempts in a wireless communication system.

FIG. 4 is a diagram illustrating an example of RACH combining across multiple attempts in a wireless communication system 400. In one configuration, the wireless communication system 400 may be a millimeter wave system. In this example, the wireless communication system 400 includes a UE 402 and a base station 406. In one configuration, multiple RACH attempts may be transmitted in different subframes. In one configuration, multiple RACH attempts may be transmitted in different time slots, e.g., to convey multiple beam IDs to the base station. The different time slots may fall in different subframes or may fall in the same subframe. In one configuration, each RACH attempt may be made at a transmission time that may be denoted by a combination of one or more of a frame index, a subframe index, or a symbol index.

In one configuration, the UE 402 may optionally determine (at 408) the number of attempts for the transmission of a RACH signal (e.g., the RACH preamble) based on one or more of path loss, configured transmit power of the UE 402, the beam correspondence at the UE 402, or the power of signals received during the synchronization subframe. In one configuration, for the UE 402, the transmit power of a RACH signal may be determined by $$P\_RACH = \min\{P\_CMAX(i), Preamble\_Received\_Target\_Power + PL\},$$

where
P_RACH is the transmit power of a RACH signal,
P_CMAX(i) is the configured UE transmit power for subframe
Preamble_Received_Target_Power may be the power level the base station (e.g., 406) would like to receive for RACH, and
PL may be the downlink path loss estimate calculated by the UE (e.g., 402), e.g., based on the received power of the beam reference signal (BRS) signal associated with the selected beam.

In one configuration, the Preamble_Received_Target_Power may be estimated based on one or more of path loss, the transmit power of the UE, or the power of signals received during the synchronization subframe.

Beam correspondence may be defined as the ability of a UE (e.g., 402) to determine a UE TX beam for the uplink transmission based on the UE's downlink measurement on the UE's RX beams. For example, in one configuration, the UE 402 may have beam correspondence if the UE 402 is able to determine a UE TX beam for the uplink transmission based on the UE's downlink measurement on the UE's RX beams, and the UE 402 does not have beam correspondence if the UE 402 is not able to determine a UE TX beam for the uplink transmission based on the UE's downlink measurement on the UE's RX beams.

Effective isotropic radiated power (EIRP) is an IEEE standardized definition of directional radio frequency (RF) power transmitted at equal power in all directions spherically from a theoretical point source. In one configuration, the EIRP of the UE 402 may be defined as the summation of transmit power (e.g., P_CMAX(i)) and array gain of the UE. In one configuration, the array gain of the UE may be a power gain of transmitted signals that is achieved by using multiple-antennas at transmitter and/or receiver. In one configuration, the array gain of the UE may be proportional to the length of the array.

In one configuration, if the UE 402 has beam correspondence and (Preamble_Received_Target_Power+PL)≤(P_CMAX(i)+Array_Gain), the UE 402 may transmit the RACH signal in one attempt. If the UE 402 has beam correspondence and (Preamble_Received_Target_Power+PL)>(P_CMAX(i)+Array_Gain), the UE 402 may transmit the RACH signal in two or more attempts. In such a configuration, the number of transmission attempts may depend on the difference between (P_CMAX(i)+Array_Gain) and (Preamble_Received_Target_Power+PL). For example, if the UE 402 has beam correspondence and (Preamble_Received_Target_Power+PL)>(P_CMAX(i)+Array_Gain), but (Preamble_Received_Target_Power+PL)≤(P_CMAX(i)+Array_Gain+alpha) (e.g., alpha=3 dB), the UE 402 may transmit the RACH signal in two attempts. If the UE 402 has beam correspondence and (Preamble_Received_Target_Power+PL)>(P_CMAX(i)+Array_Gain+alpha), but (Preamble_Received_Target_Power+PL)≤(P_CMAX(i)+Array_Gain+beta), the UE 402 may transmit the RACH signal in three attempts. If the UE 402 has beam correspondence and (Preamble_Received_Target_Power+PL)>(P_CMAX(i)+Array_Gain+beta), the UE 402 may transmit the RACH signal in four or more attempts.

In one configuration, if the UE 402 does not have beam correspondence and (Preamble_Received_Target_Power+PL)≤P_CMAX(i), the UE 402 may transmit the RACH signal in one attempt. If the UE 402 does not have beam correspondence and (Preamble_Received_Target_Power+PL)>P_CMAX(i), the UE 402 may transmit the RACH signal in two or more attempts. In such a configuration, the number of transmission attempts may depend on the difference between P_CMAX(i) and (Preamble_Received_Target_Power+PL). For example, if the UE 402 does not have beam correspondence and (Preamble_Received_Target_Power+PL)>P_CMAX(i), but (Preamble_Received_Target_Power+PL)≤(P_CMAX(i)+alpha) (e.g., alpha=3 dB), the UE 402 may transmit the RACH signal in two attempts. If the UE 402 does not have beam correspondence and (Preamble_Received_Target_Power+PL)>(P_CMAX(i)+alpha), but (Preamble_Received_Target_Power+PL)≤(P_CMAX(i)+beta), the UE 402 may transmit the RACH signal in three attempts. If the UE 402 does not have beam correspondence and (Preamble_Received_Target_Power+PL)>(P_CMAX(i)+beta), the UE 402 may transmit the RACH signal in four or more attempts.

In one configuration, the values of alpha and beta may be configurable. In such a configuration, the base station (e.g., 406) may optionally transmit (at 420) the values of alpha and/or beta as a part of a system information block (SIB) to enable each UE to determine the number of attempts for transmitting a RACH signal.

The UE 402 may transmit (at 410) the RACH signal (e.g., the RACH preamble) in the determined number of attempts to the base station 406. For example, if the determined number of attempts is one, the UE 402 may transmit the RACH signal in one attempt. If the determined number of attempts is two, the UE 402 may transmit the RACH signal in two attempts. Examples of transmitting/receiving a RACH signal in multiple attempts will be described below with reference to FIGS. 8 and 9.

The base station 406 may combine (at 412) signals of one or more RACH attempts to decode the RACH signal (e.g., the RACH preamble). For example, the base station 406 may use a signal within a single RACH attempt to decode the RACH signal from a strong UE (e.g., the transmit power of the UE is greater than the summation of the RACH preamble received target power and the path loss). The base station 406 may combine signals of two or more RACH attempts to decode the RACH signal from a weak UE (e.g., the transmit power of the UE is less than the summation of the RACH preamble received target power and the path loss).

The base station 406 may inform (at 416) the UE 402 the number of RACH attempts used for decoding the RACH signal (e.g., the RACH preamble). In one configuration, the number of RACH attempts used for decoding the RACH signal may be transmitted in a RACH message (e.g., the random access response message, also may be referred to as RACH message 2 in the RACH procedure) to the UE 402.

In one configuration, the UE 402 may optionally adjust (at 422) the transmission power for a RACH Message 3 (e.g., the connection request message) according to the number of attempts the base station 406 uses to decode the RACH preamble. In one configuration, the UE 402 may transmit the RACH Message 3 to the base station 406 using the adjusted transmission power. In one configuration, to adjust the transmission power for the RACH message 3, the UE 402 may reduce the transmission power for the RACH message 3 to be lower than a threshold (e.g., less than the maximum transmit power of the UE 402) if the base station 406 decodes the RACH preamble in one attempt. In one configuration, to adjust the transmission power for the RACH message 3, the UE 402 may increase the transmission power for the RACH message 3 to be higher than a threshold (e.g., higher than 90% of the maximum transmit power of the UE 402) if the base station 406 decodes the RACH preamble in two or more attempts. In one configuration, the UE 402 may transmit the RACH Message 3 using the number of attempts that the base station 406 uses to decode the RACH preamble.

Figure 5:
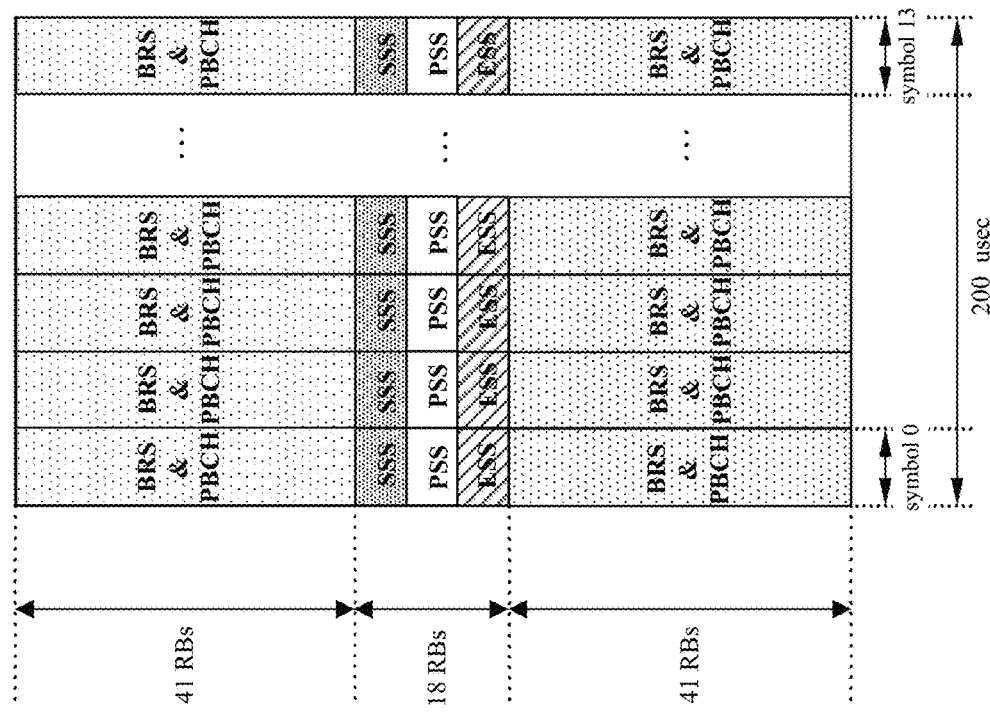
FIG. 5 is diagram illustrating an example of a synchronization subframe used in a wireless communication system.

FIG. 5 is diagram illustrating an example of a synchronization subframe 500 used in a wireless communication system. In this example, 1, 2, 4 or 8 antenna ports may be active. The beam of each antenna port may change from symbol to symbol within the synchronization subframe 500. A primary synchronization signal (PSS), an extended synchronization signal (ESS), a secondary synchronization signal (SSS), and a PBCH may be transmitted by all antenna ports on the same subcarriers. A BRS may be transmitted by all antenna ports, but either on disjoint subcarriers or are code multiplexed. The contents of the ESS may change from symbol to symbol. Thus a UE (e.g., 402) may identify a particular symbol within the synchronization subframe 500 based on the contents of the ESS.

Figure 6:
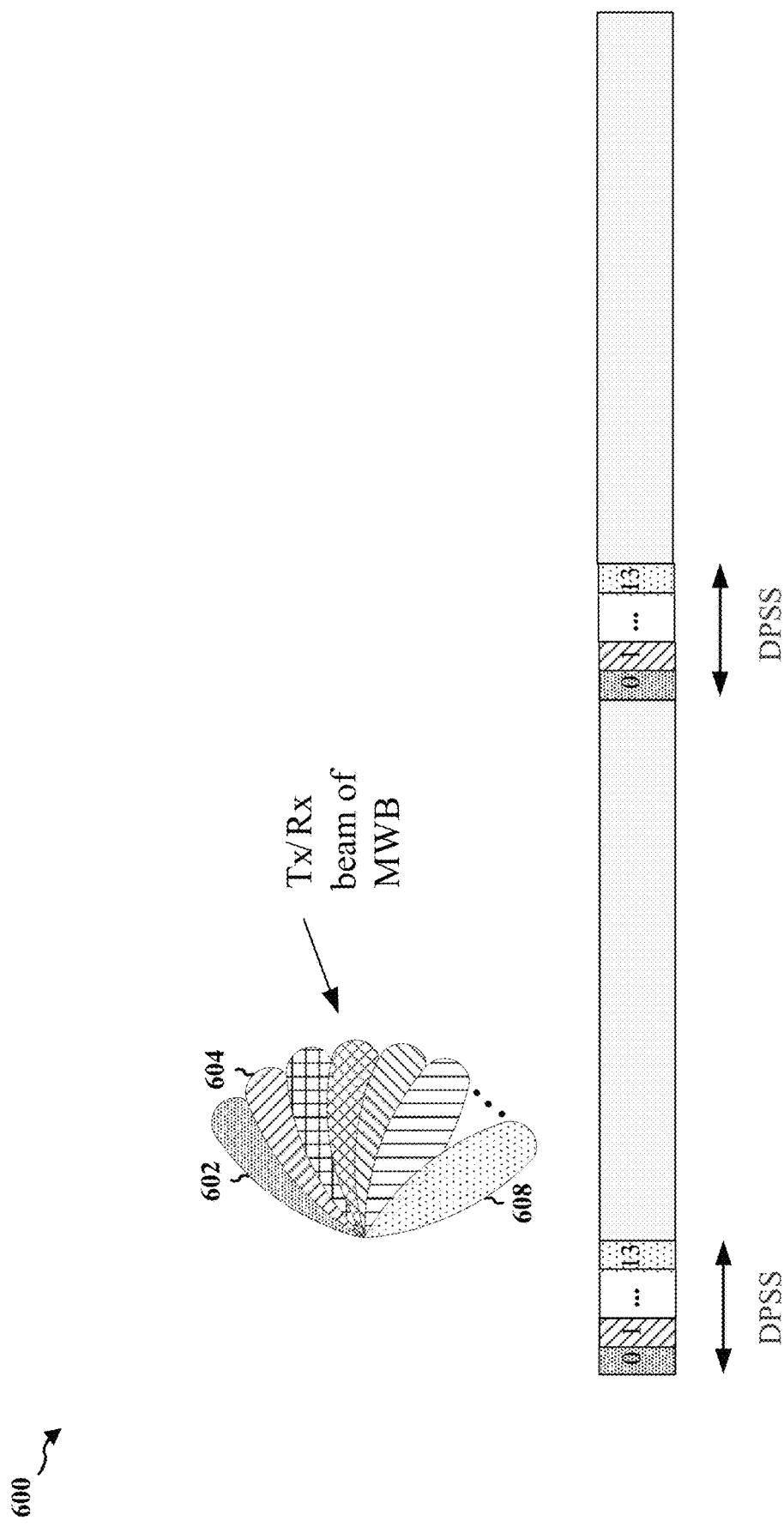
FIG. 6 is a diagram illustrating an example of directional PSS (DPSS) in a millimeter wave system.

FIG. 6 is a diagram 600 illustrating an example of directional PSS (DPSS) in a millimeter wave system. In one configuration, the DPSS may be within the synchronization subframe 500 described above in FIG. 5. In FIG. 6, different TX/RX beam directions (e.g., 602, 604, . . . 608) of millimeter wave band are illustrated with different patterns. To enable the UE (e.g., 402) to learn useful TX/RX beam pairs and to overcome high path loss, beamforming is used on RX and TX. The base station (e.g., 406) sends out PSS on several successive symbols but in different beam directions sweeping through the entire sector. For example, in each synchronization subframe, the PSS on symbol 0 may be in beam direction 602, the PSS on symbol 1 may be in beam direction 604, . . . , and the PSS on symbol 13 may be in beam direction 608. By sending out the PSS in different beam directions, the UE may be able to select the best beam pair for TX/RX.

Figure 7:
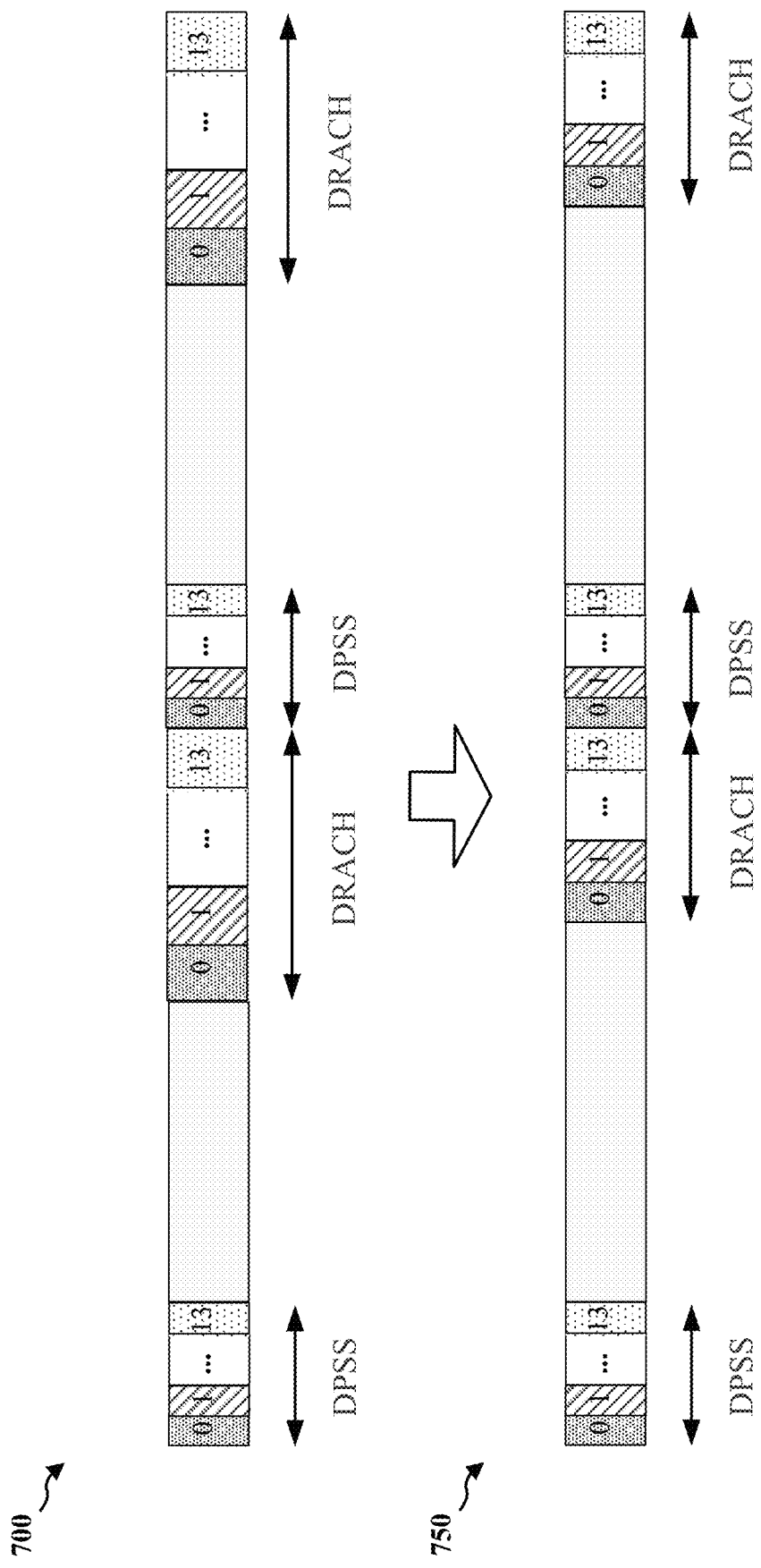
FIG. 7 illustrates an example of reducing the DRACH duration by using RACH combining across multiple attempts.

FIG. 7 illustrates an example of reducing the DRACH duration by using RACH combining across multiple attempts. Specifically, diagram 700 shows the DRACH duration before using RACH combining across multiple attempts and diagram 750 shows the reduced DRACH duration after using RACH combining across multiple attempts.

The UE (e.g., 402) may select the best beam based on the received DPSS and find corresponding timing to transmit RACH signal. In one configuration, the best beam may be the beam with the strongest signal and/or the least inference. In one configuration, the UE may select subcarrier region and cyclic shift randomly. As shown in diagram 700, the RACH duration depends on the UE with the weakest link gain. As the UE of the weakest link gain needs more time to transmit enough energy for the RACH signal to be detected by the base station, the RACH duration may be long, thus leading to high overhead.

In one configuration, using RACH combining across multiple attempts may reduce RACH duration by a factor of two, as illustrated in diagram 750. UEs with good link gain transmit the RACH in one attempt. UEs with poor link gain transmit the RACH in two or more attempts. The base station (e.g., 406) may keep a memory for energy received in one or more previous attempts and combine received energy across two or more attempts to provide better link budget for weak UEs.

Figure 8:
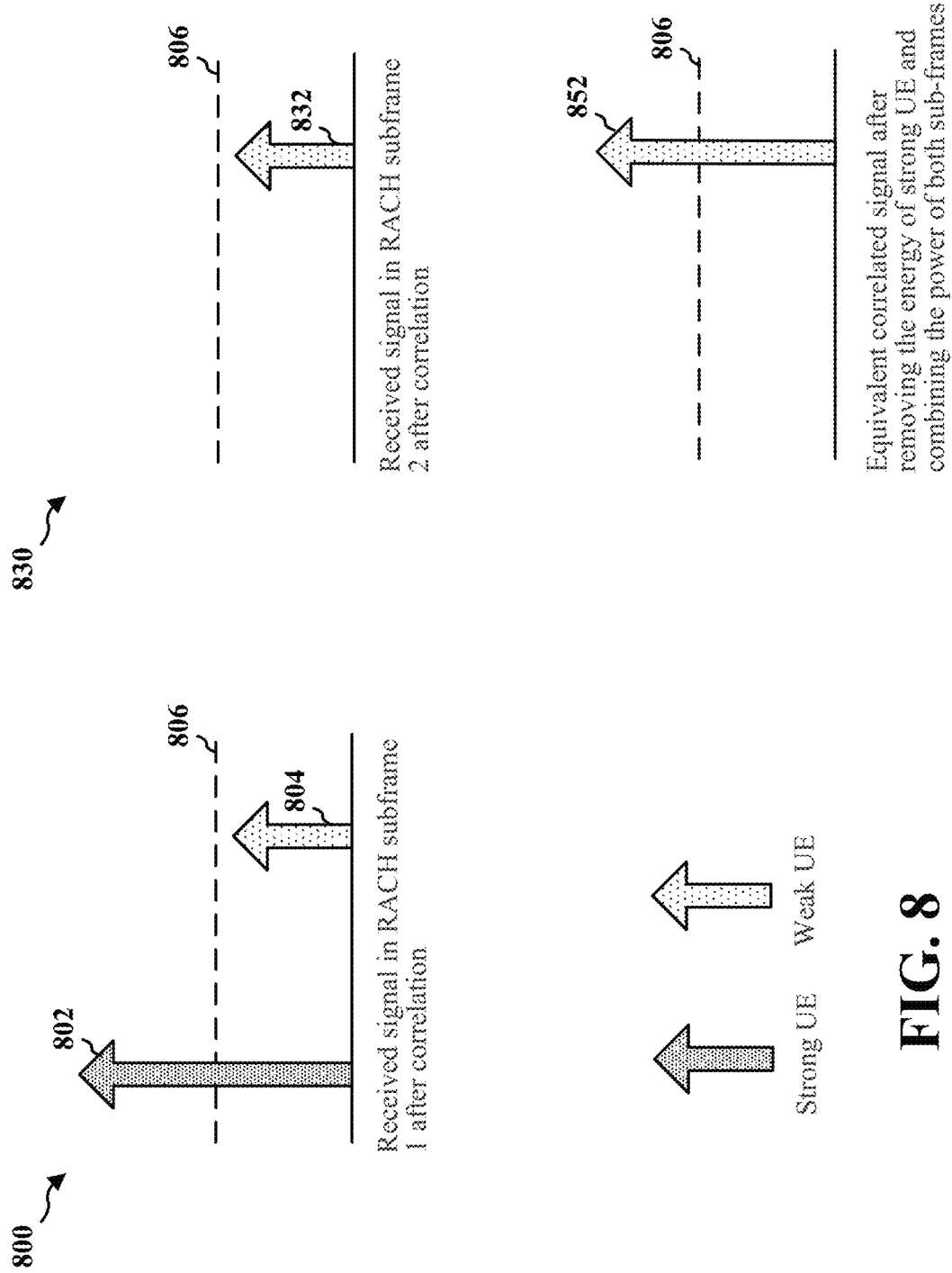
FIG. 8 is a diagram illustrating an example of combining signals of two RACH subframes to decode a RACH signal.

FIG. 8 is a diagram illustrating an example of combining signals of two RACH subframes to decode a RACH signal. At 800, the base station (e.g., 406) receives a signal 802 from a strong UE and a signal 804 from a weak UE in RACH subframe 1. In one configuration, each of the signals 802 and 804 may convey at least a portion of the RACH preamble from the respective UE. A power threshold level 806 indicates the threshold level of power in a signal after correlation of the signal with a predefined RACH preamble in order for the base station to detect the signal. Because the signal 802 exceeds the power threshold level 806 after correlation and the signal 804 does not exceed the power threshold level 806 after correlation, the base station can only detect the signal 802 from the strong UE. In one configuration, the base station may find the total power of the RACH subframe 1 after correlation, and subtract the correlated power corresponding to the signal 802 to obtain an updated power of RACH subframe 1. In one configuration, the base station may transmit a RACH message 2, i.e., a random access response message of a contention based random access procedure, to the corresponding beam direction to convey whether or not the base station has decoded the RACH preamble in one subframe. Upon reception of the RACH message 2, the weak UE may realize that the base station decoded a strong UE's RACH signal because the base station could not have decoded the weak UE's signal in one RACH subframe.

At 830, the base station receives a signal 832 from the weak UE in RACH subframe 2. The base station determines the power in RACH subframe 2 after correlation and adds the power to the updated power of RACH subframe 1. After addition, a signal 852 is obtained. The signal 852 is an equivalent correlated signal after removing the energy of the strong UE and combining the power of subframes 1 and 2. The signal 852 may exceed the power threshold level 806. Thus, the signal 852 of the weak UE can be detected by the base station.

Figure 9:
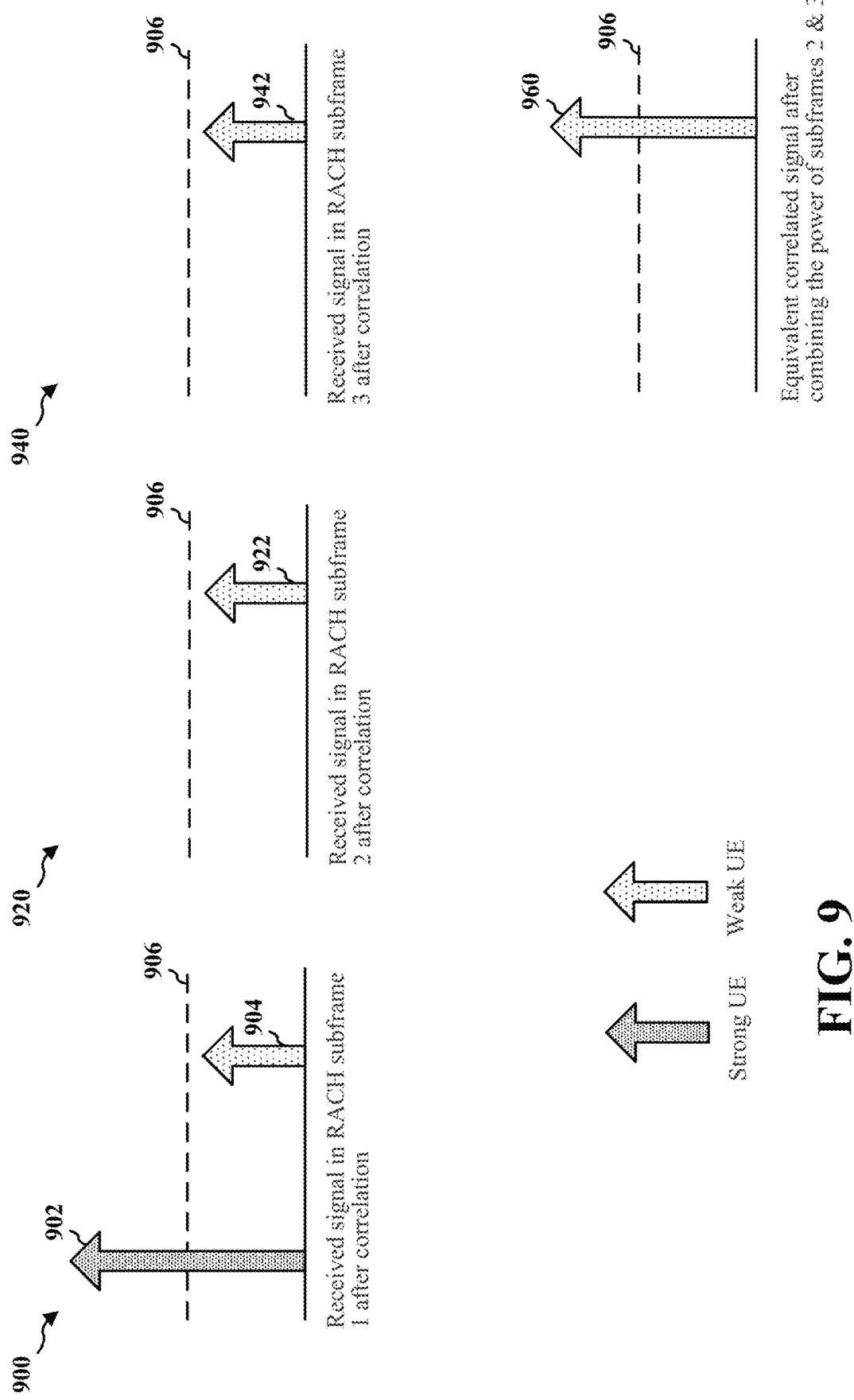
FIG. 9 is a diagram illustrating another example of combining signals of two RACH subframes to decode a RACH signal.

FIG. 9 is a diagram illustrating another example of combining signals of two RACH subframes to decode a RACH signal. At 900, the base station (e.g., 406) receives a signal 902 from a strong UE and a signal 904 from a weak UE in RACH subframe 1. In one configuration, each of the signals 902 and 904 may convey the RACH preamble from the respective UE. A power threshold level 906 indicates the threshold level of power in a signal after the signal gets correlated with a RACH preamble in order for the base station to detect that signal. Because the signal 902 exceeds the power threshold level 906 after correlation and the signal 904 does not exceed the power threshold level 906 after correlation, the base station can only detect the signal 902 from the strong UE. In one configuration, the base station may ignore the remaining power of the RACH subframe 1. In one configuration, the base station may transmit a RACH message 2, e.g., a random access response message of contention based random access procedure, to the corresponding beam direction to convey whether or not the base station has decoded the RACH preamble in one subframe. Upon reception of the RACH message 2, the weak UE may realize that the base station decoded a strong UE's RACH signal because the base station cannot decode the weak UE's signal in one RACH subframe. The weak UE may realize that the RACH signal may need to be transmitted in two subsequent subframes so that the base station can decode the RACH signal from the weak UE.

At 920, the base station receives a signal 922 from the weak UE in RACH subframe 2. At 940, the base station receives a signal 942 from the weak UE in RACH subframe 3. Neither the signal 922 nor the signal 942, after being correlated with the RACH preamble, exceeds the power threshold level 906. The base station may non-coherently combine the power of subframes 2 and 3 and obtain an equivalent correlated signal 960 for the weak UE, which exceeds the power threshold level 906. Thus, the base station is able to detect the weak UE's signal by correlating the received signal with the RACH preamble and then combining the power of the correlated signals of subframes 2 and 3. In one configuration, non-coherently combining of two correlated signals may mean the base station does not need the phase information of the correlated signals to combine the signals. In one configuration, non-coherently combining may mean combining the amplitude of the correlated signals/power.

Figure 10:
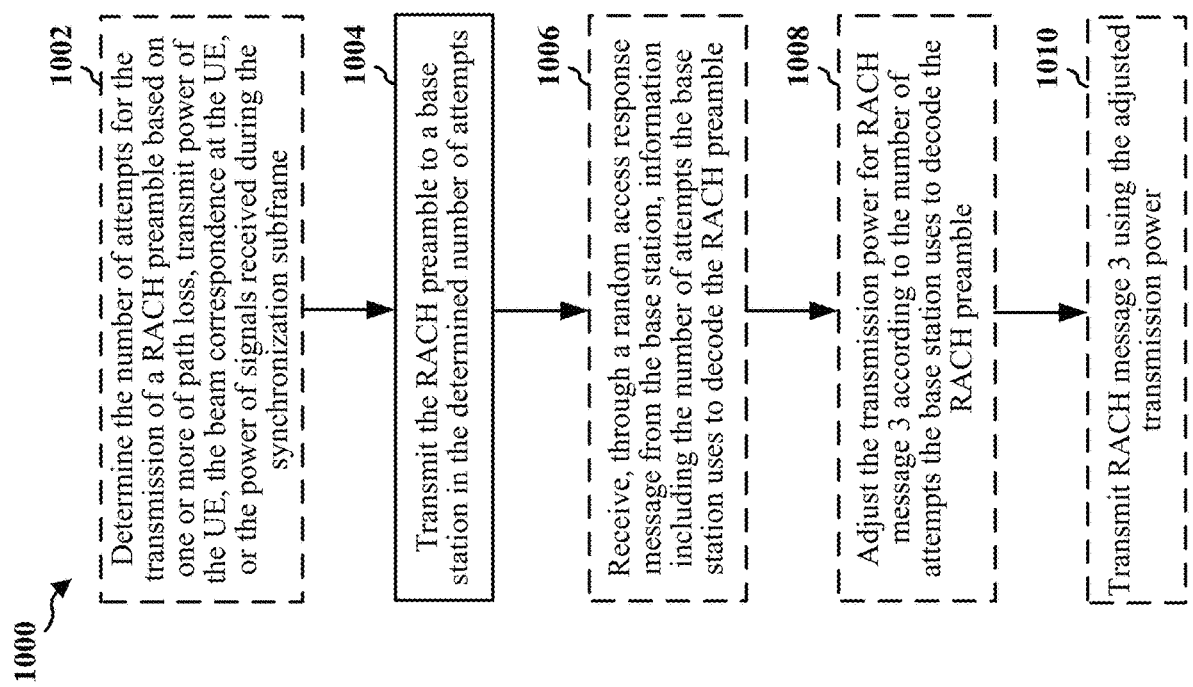
FIG. 10 is a flowchart of a method of wireless communication.

FIG. 10 is a flowchart 1000 of a method of wireless communication. The method may be performed by a UE (e.g., the UE 104, 350, 402, or the apparatus 1202/1202'). At 1002, the UE may optionally determine the number of attempts for a transmission of a RACH signal (e.g., the RACH preamble) based on one or more of path loss, the configured transmit power of the UE, the beam correspondence at the UE, or the power of signals received during a synchronization subframe. In one configuration, the UE may have the beam correspondence when the UE is able to determine a transmit beam for uplink transmission of the UE based on downlink measurements on receive beams of the UE. In one configuration, the operations performed at 1002 may be the operations described above with reference to 408 of FIG. 4. In one configuration, the operations performed at 1002 may be the operations described below with reference to FIG. 11. In one configuration, the synchronization subframe may include one or more of primary synchronization signal, secondary synchronization signal, extended synchronization signal, physical broadcast channel, or beam reference signal.

In one configuration, multiple RACH attempts may be transmitted in different subframes. In one configuration, multiple RACH attempts may be transmitted in different time slots, e.g., to convey multiple beam IDs to the base station. The different time slots may be in different subframes or may be in the same subframe. In one configuration, each RACH attempt may be made at a transmission time that may be denoted by a combination of one or more of a frame index, a subframe index, or a symbol index.

In one configuration, to determine the number of attempts, the UE may estimate the RACH preamble received target power based on one or more of the path loss, the transmit power of the UE, or the power of the signals received during the synchronization subframe. In such a configuration, the number of attempts may be determined based on one or more of the path loss, the transmit power of the UE, the beam correspondence at the UE, or the RACH preamble received target power.

In one configuration, the determined number of attempts may be one when the maximum EIRP of the UE is greater than the summation of the RACH preamble received target power, the path loss, and an offset. In one configuration, the determined number of attempts may be more than one when the maximum EIRP of the UE is less than the summation of the RACH preamble received target power, the path loss, and the offset. In one configuration, the value of the offset may be zero when the UE has the beam correspondence. In one configuration, the value of the offset may be greater than zero when the UE does not have the beam correspondence. In one configuration, the offset may be determined based on the achievable array gain of the UE. In one configuration, the EIRP of the UE may be defined as the summation of the transmit power of the UE and the array gain of the UE.

In one configuration, the path loss may be determined based on a received signal (e.g., the BRS signal) during a synchronization subframe. In one configuration, the path loss may be determined individually for each of the multiple beams transmitted during a synchronization subframe. In one configuration, the configured transmit power of the UE and the RACH preamble received target power may be received from a base station during a transmission of a SIB. In one configuration, the UE may receive several threshold parameters (e.g., alpha, beta described above with reference to FIG. 4) from the base station during the reception of a SIB that will allow the UE to determine the number of attempts that the base station may need for decoding a RACH signal from the UE.

At 1004, the UE may transmit the RACH signal (e.g., the RACH preamble) in the determined number of attempts. In one configuration, the operations performed at 1004 may be the operations described above with reference to 410 of FIG. 4.

In one configuration, the RACH signal may be a DRACH signal. In one configuration, the DRACH signal may be transmitted via the best beam selected from several beams received during a synchronization subframe. In one configuration, the DRACH signal may be transmitted at a transmission time when a base station receives signal using the best beam. The best beam may denote a beam whose corresponding reference signal, transmitted during a synchronization subframe (e.g., the synchronization subframe 500), is the strongest reference signal received at the UE among all possible beams. In one configuration, the transmission time for transmitting the DRACH signal may be denoted by a combination of one or more of a frame index, a subframe index, or a symbol index. In one configuration, the DRACH signal may be transmitted during the first available RACH attempt.

At 1006, the UE may optionally receive, through a RACH message 2 (e.g., the random access response message) from the base station, information including the number of attempts the base station uses to decode the RACH preamble. In one configuration, the operations performed at 1006 may be the operations described above with reference to 416 of FIG. 4.

At 1008, the UE may optionally adjust the transmission power for a RACH message 3 (e.g., the connection request message) according to the number of attempts the base station uses to decode the RACH preamble. In one configuration, the operations performed at 1008 may be the operations described above with reference to 422 of FIG. 4.

In one configuration, to adjust the transmission power for the RACH message 3, the UE may decrease the transmission power to be lower than a threshold (e.g., lower than the maximum transmit power of the UE) if the base station decodes the RACH preamble in one attempt. In one configuration, to adjust the transmission power for the RACH message 3, the UE may increase the transmission power to be higher than a threshold (e.g., higher than 90% of the maximum transmit power of the UE) if the base station decodes the RACH preamble in two or more attempts.

At 1010, the UE may optionally transmit the RACH message 3 (e.g., the connection request message) using the adjusted transmission power. In one configuration, the RACH message 3 may be transmitted in the number of attempts used by the base station to decode the RACH preamble. For example, if the base station decodes the RACH preamble in one attempt, the UE may transmit the RACH message 3 in one attempt; if the base station decodes the RACH preamble in two attempts, the UE may transmit the RACH message 3 in two attempts.

In one configuration, the information received from the base station may further include the beam gain measured at the base station while the RACH preamble is received. In such a configuration, the UE may transmit the RACH message 3 based on the received number of attempts and/or the received beam gain. For example, the UE may determine the number of attempts for transmitting the RACH message 3 based on the received number of attempts and/or the received beam gain.

Figure 11:
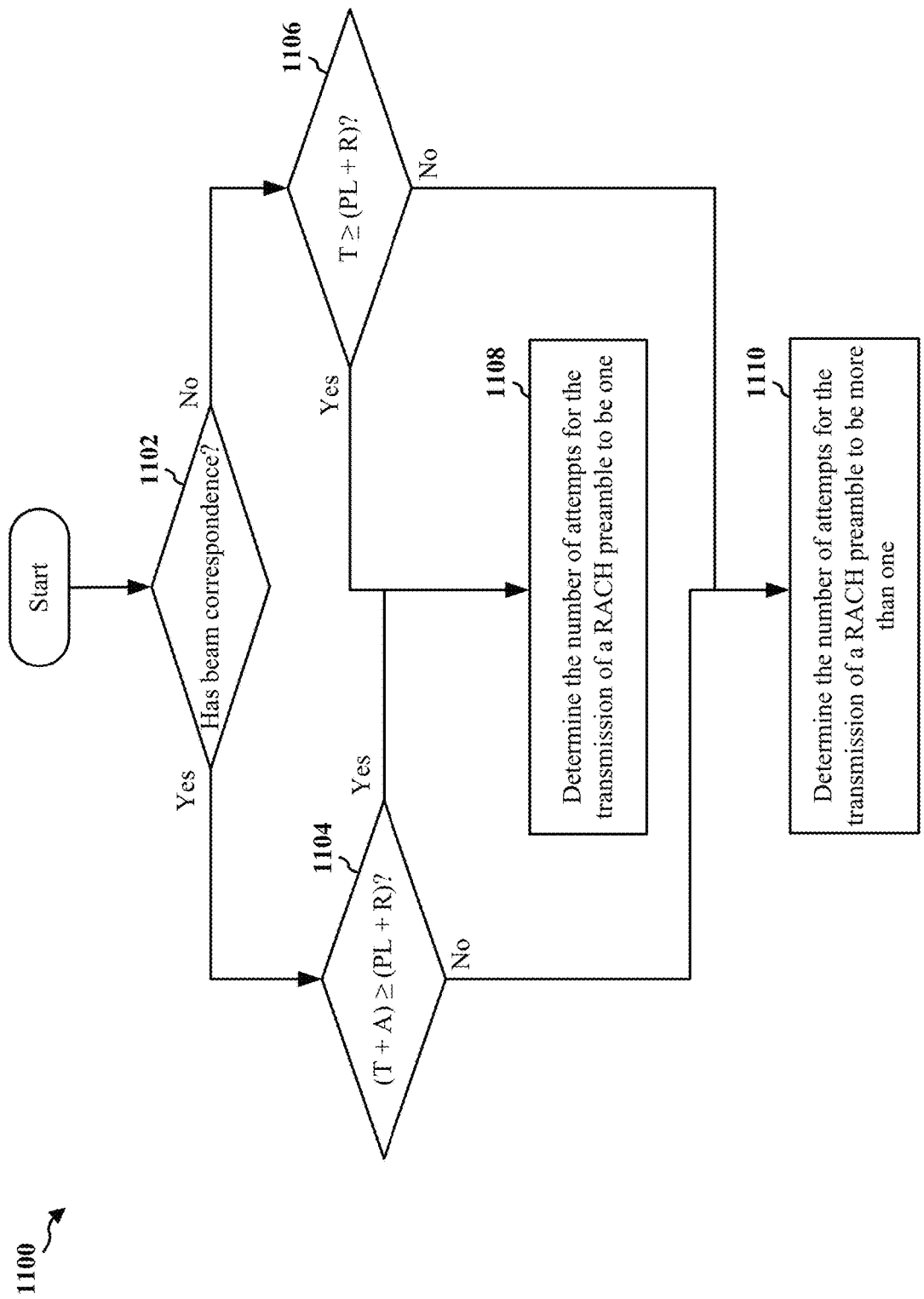
FIG. 11 is a flowchart of a method of wireless communication.

FIG. 11 is a flowchart 1100 of a method of wireless communication. The method may be performed by a UE (e.g., the UE 104, 350, 402, or the apparatus 1202/1202'). In one configuration, the method may include the operations described above with reference to 408 of FIG. 4. In one configuration, the method may include the operations described above with reference to 1002 of FIG. 10. At 1102, the UE may determine whether the UE has beam correspondence. If the UE has beam correspondence, the UE may proceed to 1104. If the UE does not have beam correspondence, the UE may proceed to 1106.

At 1104, the UE may determine whether the UE's EIRP, e.g., the summation of the UE's transmit power (T) and array gain (A), is greater than or equal to the summation of the path loss (PL) and the preamble received target power (R). If $(T+A) \geq (PL+R)$, the UE may proceed to 1108. If $(T+A) < (PL+R)$, the UE may proceed to 1110.

At 1106, the UE may determine whether the UE's transmit power (T) is greater than or equal to the summation of the path loss (PL) and the preamble received target power (R). If $T \geq (PL+R)$, the UE may proceed to 1108. If $T < (PL+R)$, the UE may proceed to 1110.

At 1108, the UE may determine the number of attempts for the transmission of a RACH preamble to be one.

At 1110, the UE may determine the number of attempts for the transmission of a RACH preamble to be more than one.

Figure 12:
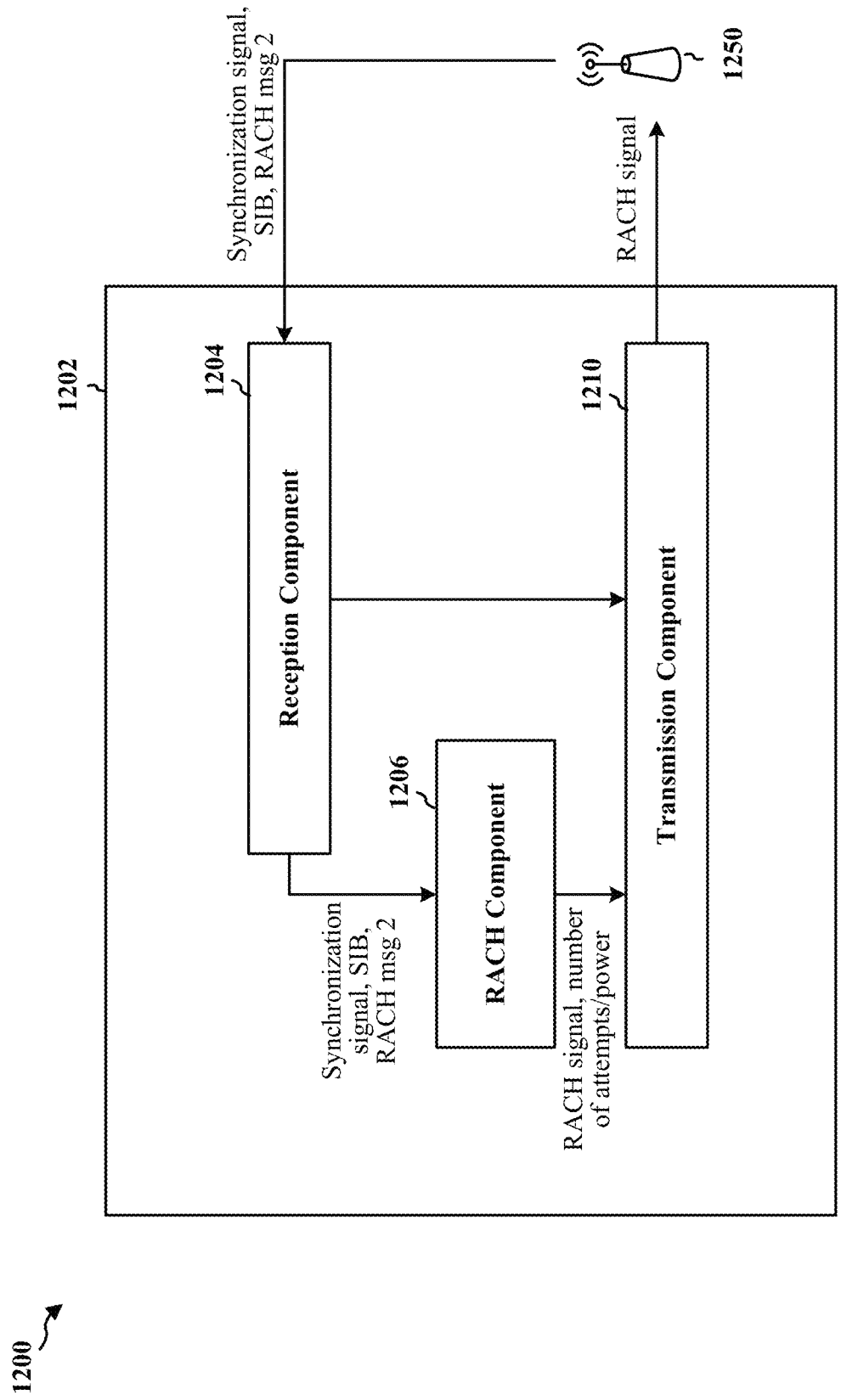
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus 1202 includes a reception component 1204 that receives synchronization signal, SIB, and RACH message 2 (e.g., the random access response message) from a base station 1250. In one configuration, the SIB may include the values of alpha and beta that enables the apparatus 1202 to determine the number of attempts for transmitting a RACH signal, as described above with reference to FIG. 4. In one configuration, the RACH message 2 may include the number of attempts the base station 1250 uses to decode the RACH preamble. In one configuration, the reception component 1204 may perform operations described above with reference to 1006 of FIG. 10.

The apparatus 1202 may include a transmission component 1210 that transmits a RACH signal (e.g., the RACH preamble or RACH message 3) to the base station 1250. In one configuration, the transmission component 1210 may perform operations described above with reference to 1004 or 1010 of FIG. 10. In one configuration, the transmission component 1210 may perform operations described above with reference to 1004 or 1010 of FIG. 10. The reception component 1204 and the transmission component 1210 may cooperate with each other to coordinate the communications of the apparatus 1202.

The apparatus 1202 may include a RACH component 1206 that determines the number of attempts and/or power for transmitting RACH signal and generates RACH signal. In one configuration, the RACH component 1206 determines the number of attempts for transmitting RACH signal based on the synchronization signal and SIB received from the reception component 1204. In one configuration, the RACH component 1206 may adjust the transmission power for a RACH message 3 based on the number of attempts that the base station 1250 uses to decode the RACH preamble. In one configuration, the RACH component 1206 may perform operations described above with reference to 1002 or 1008 of FIG. 10, or 1102-1110 of FIG. 11.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
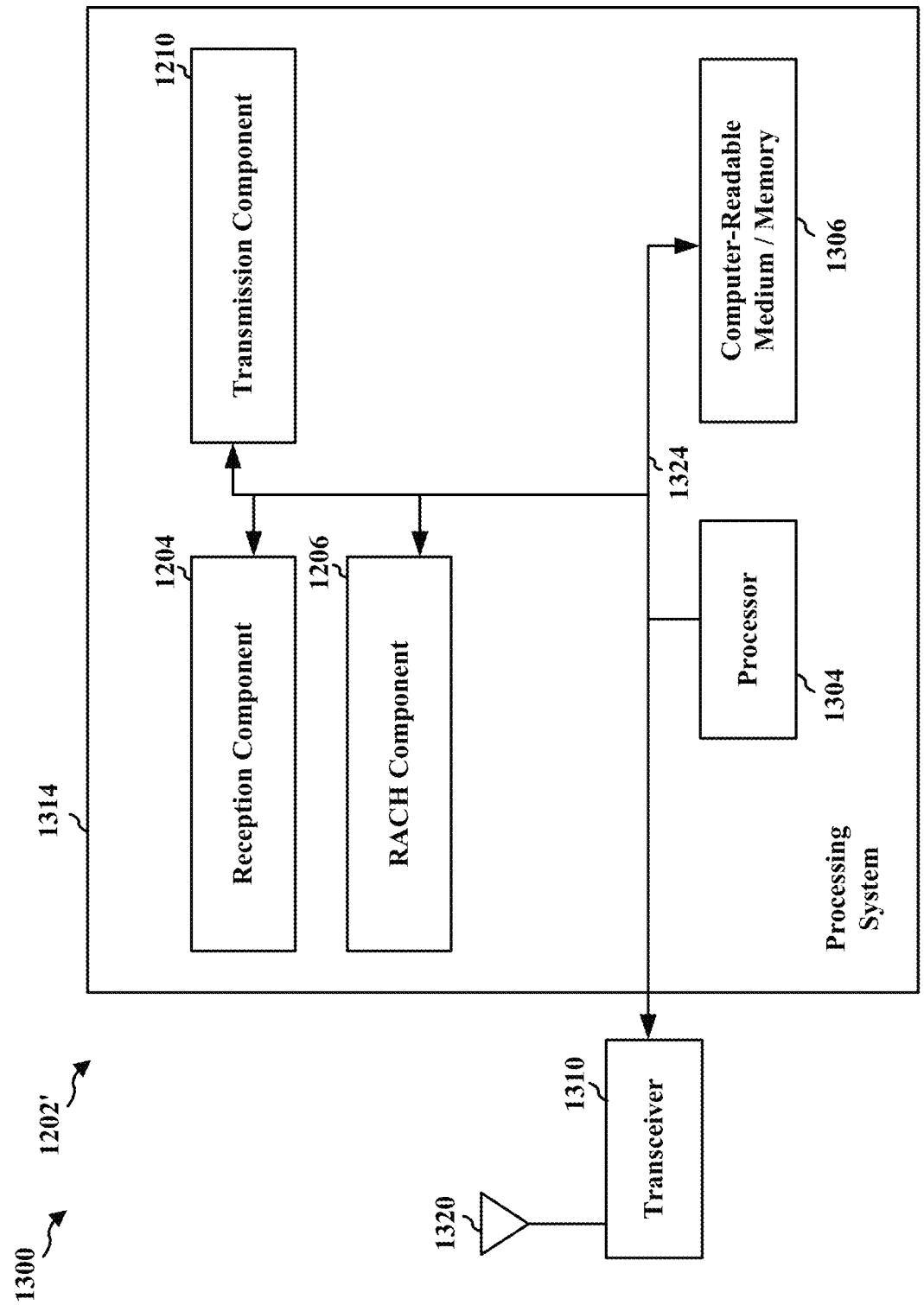
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication may include means for determining the number of attempts for a transmission of a RACH signal based on one or more of path loss, the transmit power of the apparatus 1202/1202', the beam correspondence at the apparatus 1202/1202', or the power of signals received during the synchronization subframe. In one configuration, the means for determining the number of attempts may perform operations descried above with reference to 1002 of FIG. 10 or 1102-1110 of FIG. 11. In one configuration, the means for determining the number of attempts may be the RACH component 1206 or the processor 1304. In one configuration, the means for determining the number of attempts may estimate the RACH preamble received target power based on one or more of the path loss, the transmit power of the apparatus 1202/1202', or the power of the signals received during the synchronization subframe.

In one configuration, the apparatus 1202/1202' may include means for transmitting the RACH signal in the determined number of attempts. In one configuration, the means for transmitting the RACH signal in the determined number of attempts may perform operations descried above with reference to 1004 of FIG. 10. In one configuration, the means for transmitting the RACH signal in the determined number of attempts may be the one or more antennas 1320, the transceiver 1310, the transmission component 1210, or the processor 1304.

In one configuration, the apparatus 1202/1202' may include means for transmitting a RACH preamble to a base station in one or more attempts. In one configuration, the means for transmitting a RACH preamble to a base station in one or more attempts may perform operations descried above with reference to 1004 of FIG. 10. In one configuration, the means for transmitting a RACH preamble to a base station in one or more attempts may be the one or more antennas 1320, the transceiver 1310, the transmission component 1210, or the processor 1304.

In one configuration, the apparatus 1202/1202' may include means for receiving, through a random access response message from the base station, information comprising a number of attempts the base station uses to decode the RACH preamble. In one configuration, the means for receiving information comprising a number of attempts the base station uses to decode the RACH preamble may perform operations descried above with reference to 1006 of FIG. 10. In one configuration, the means for receiving information comprising a number of attempts the base station uses to decode the RACH preamble may be the one or more antennas 1320, the transceiver 1310, the reception component 1204, or the processor 1304.

In one configuration, the apparatus 1202/1202' may include means for adjusting a transmission power for a connection request message according to the number of attempts the base station uses to decode the RACH preamble. In one configuration, the means for adjusting a transmission power for a connection request message according to the number of attempts the base station uses to decode the RACH preamble may perform operations descried above with reference to 1008 of FIG. 10. In one configuration, the means for adjusting a transmission power for a connection request message according to the number of attempts the base station uses to decode the RACH preamble may be the RACH component 1206 or the processor 1304.

In one configuration, the means for adjusting the transmission power for the connection request message may be configured to decrease the transmission power to be lower than a threshold when the base station decodes the RACH preamble in one attempt. In one configuration, the means for adjusting the transmission power for the connection request message may be configured to increase the transmission power to be higher than a threshold when the base station decodes the RACH preamble in two or more attempts.

In one configuration, the apparatus 1202/1202' may include means for transmitting the connection request message using the adjusted transmission power. In one configuration, the means for transmitting the connection request message using the adjusted transmission power may perform operations descried above with reference to 1010 of FIG. 10. In one configuration, the means for transmitting the connection request message using the adjusted transmission power may be the one or more antennas 1320, the transceiver 1310, the transmission component 1210, or the processor 1304.

In one configuration, the apparatus 1202/1202' may include means for transmitting a connection request message in the number of attempts. In one configuration, the means for transmitting a connection request message in the number of attempts may be the one or more antennas 1320, the transceiver 1310, the transmission component 1210, or the processor 1304.

In one configuration, the apparatus 1202/1202' may include means for transmitting a connection request message based on the number of attempts and the beam gain. In one configuration, the means for transmitting a connection request message based on the number of attempts and the beam gain may be the one or more antennas 1320, the transceiver 1310, the transmission component 1210, or the processor 1304.

In one configuration, the apparatus 1202/1202' may include means for receiving a synchronization subframe. In one configuration, the means for receiving a synchronization subframe may be the one or more antennas 1320, the transceiver 1310, the reception component 1204, or the processor 1304.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
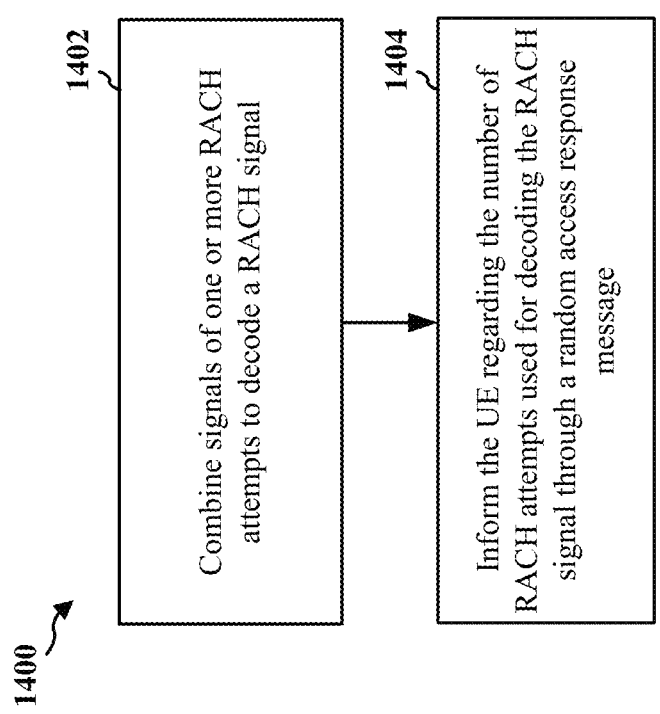
FIG. 14 is a flowchart of a method of wireless communication.

FIG. 14 is a flowchart 1400 of a method of wireless communication. The method may be performed by an eNB (e.g., the eNB 102, 310, 406, or the apparatus 1502/1502'). At 1402, the eNB may combine signals of one or more RACH attempts to decode a RACH signal. In one configuration, the operations performed at 1402 may be the operations described above with reference to 412 of FIG. 4. In one configuration, the operations performed at 1402 may be the operations described above with reference to FIG. 8 or FIG. 9.

In one configuration, to combine the signal of one or more RACH attempts to detect the RACH signal, the eNB may non-coherently add power of the signals of the one or more RACH attempts after correlating these signals with the RACH preamble to obtain an equivalent signal that is detectable by the eNB. In one configuration, non-coherently adding may mean the eNB do not need the phase information of the correlated signals to combine the power of the correlated signals. In one configuration, non-coherently adding may mean adding the amplitude of the power of the correlated signals. In one configuration, the RACH signal may be a DRACH signal.

At 1404, the eNB may inform the UE, through a random access response message, regarding the number of RACH attempts that the eNB uses for decoding the RACH signal. In one configuration, the operations performed at 1404 may be the operations described above with reference to 416 of FIG. 4. In one configuration, the random access response message may be the message 2 in a RACH procedure.

Figure 15:
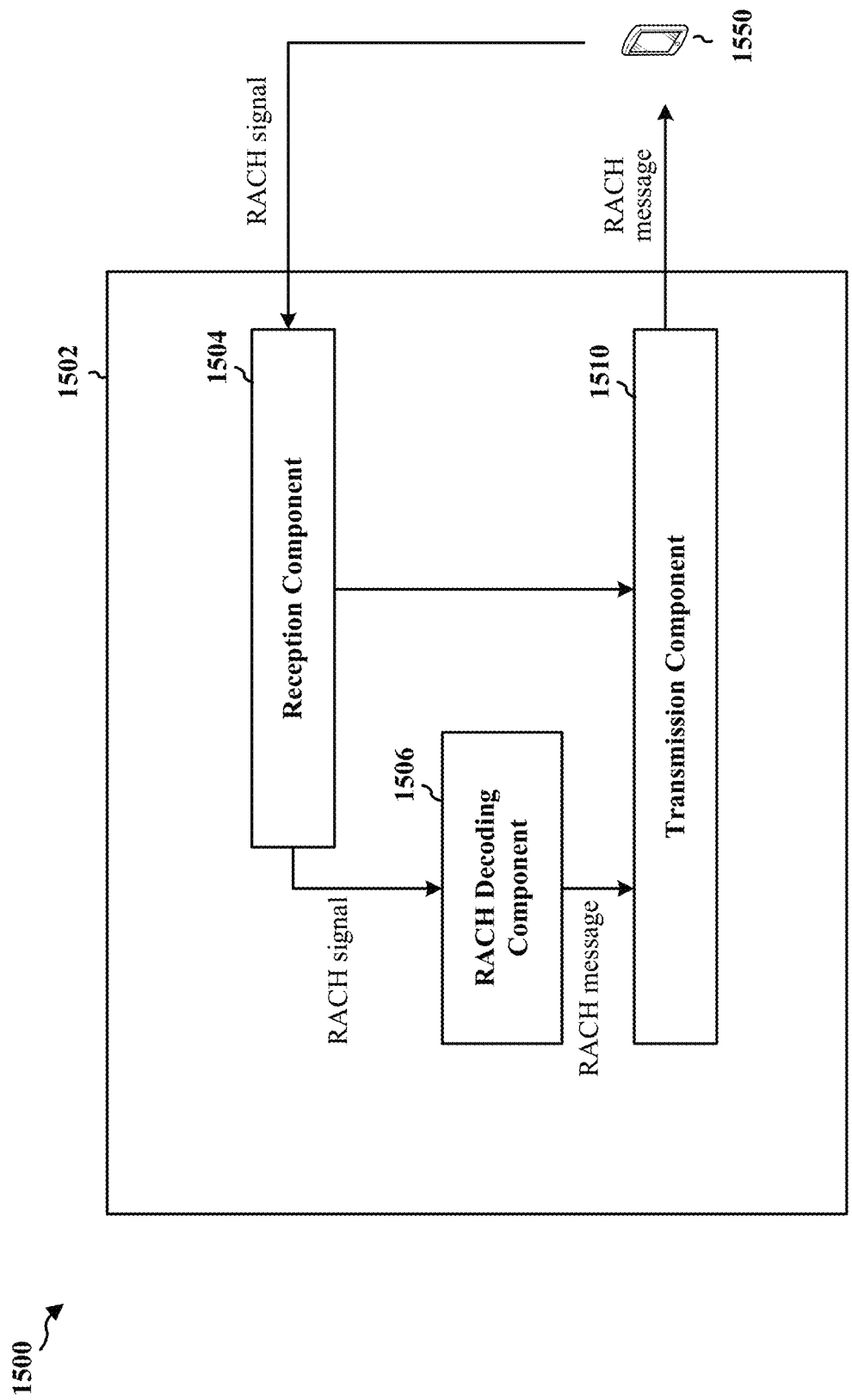
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a eNB. The apparatus 1502 includes a reception component 1504 that receives RACH signal from a UE 1550. The apparatus 1502 may include a transmission component 1510 that transmits RACH message to the UE 1550. In one configuration, the transmission component 1510 may perform operations described above with reference to 1404 of FIG. 14. The reception component 1504 and the transmission component 1510 may cooperate with each other to coordinate the communications of the apparatus 1502.

The apparatus 1502 may include a RACH decoding component 1506 that decodes RACH signal by combining signals of one or more RACH attempts. In one configuration, the RACH decoding component 1506 may perform operations described above with reference to 1402 of FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
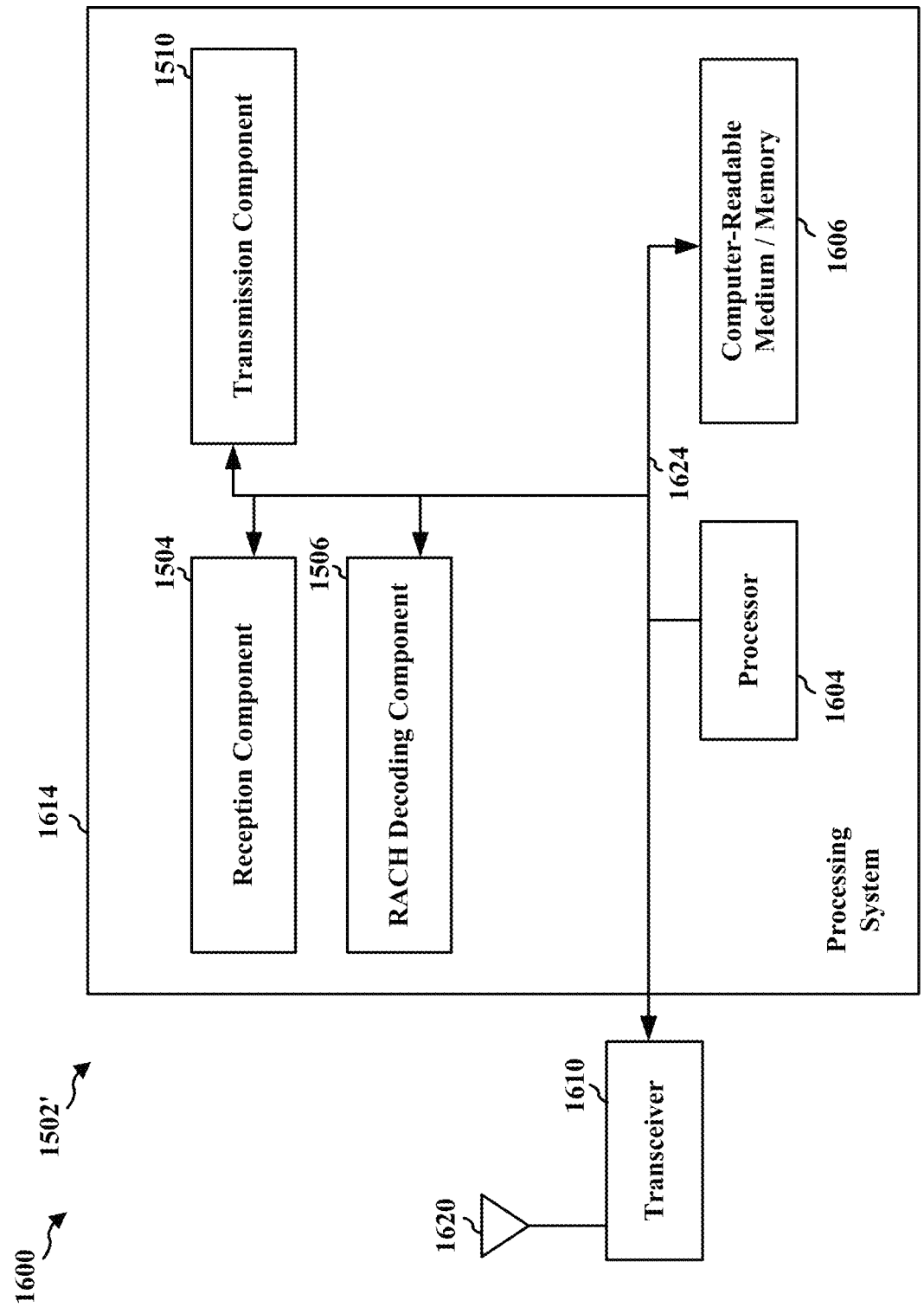
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1510. The components may be software components running in the processor 1604, resident/stored in the computer readable medium/memory 1606, one or more hardware components coupled to the processor 1604, or some combination thereof. The processing system 1614 may be a component of the eNB 310 and may include the memory 376 and/or at least one of the TX processor 316, the RX processor 370, and the controller/processor 375.

In one configuration, the apparatus 1502/1502' for wireless communication includes means for combining signals of one or more RACH attempts to decode a RACH signal. In one configuration, the means for combining signals of one or more RACH attempts to decode a RACH signal may perform operations descried above with reference to 1402 of FIG. 14. In one configuration, the means for combining signals of one or more RACH attempts to decode a RACH signal may be the RACH decoding component 1506 or the processor 1604. In one configuration, the means for combining the signals of the one or more RACH attempts may be configured to non-coherently add power of the signals of the one or more RACH attempts.

In one configuration, the apparatus 1502/1502' may include means for informing a UE regarding the number of RACH attempts used for decoding the RACH signal through a random access response message. In one configuration, the means for informing a UE regarding the number of RACH attempts used for decoding the RACH signal through a random access response message may perform operations descried above with reference to 1404 of FIG. 14. In one configuration, the means for informing a UE regarding the number of RACH attempts used for decoding the RACH signal through a random access response message may be the one or more antennas 1620, the transceiver 1610, the transmission component 1510, or the processor 1604.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    determining a number of attempts for a transmission of a random-access channel (RACH) signal based on a path loss, a transmit power of the UE, and a RACH preamble received target power; and
    transmitting the RACH signal in the determined number of attempts.

2. The method of claim 1, wherein the UE has a beam correspondence when the UE is able to determine a transmit beam for uplink transmission of the UE based on downlink measurements on receive beams of the UE.

3. The method of claim 1, wherein the determining the number of attempts comprises:
    estimating the RACH preamble received target power based on one or more of the path loss, the transmit power of the UE, or a power of signals received during a synchronization subframe, wherein the number of attempts is determined based on the path loss, the transmit power of the UE, a beam correspondence at the UE, and the RACH preamble received target power.

4. The method of claim 3, wherein the determined number of attempts is one when a maximum effective isotropic radiated power (EIRP) of the UE is greater than a summation of the RACH preamble received target power, the path loss, and an offset, wherein the determined number of attempts is more than one when the maximum EIRP of the UE is less than the summation of the RACH preamble received target power, the path loss, and the offset.

5. The method of claim 4, wherein a value of the offset is zero when the UE has the beam correspondence.

6. The method of claim 4, wherein a value of the offset is greater than zero when the UE does not have the beam correspondence.

7. The method of claim 6, wherein the offset is determined based on an achievable array gain of the UE.

8. The method of claim 4, wherein the EIRP of the UE is defined as a summation of the transmit power of the UE and an array gain of the UE.

9. The method of claim 1, wherein the path loss is determined individually for each of a plurality of beams received during a synchronization subframe.

10. The method of claim 1, wherein the RACH signal is a directional RACH (DRACH) signal, wherein the DRACH signal is transmitted at a transmission time for a best beam.

11. The method of claim 10, wherein the best beam denotes a beam whose corresponding reference signal, received during a synchronization subframe, is a strongest reference signal at the UE among all possible beams.

12. The method of claim 10, wherein the DRACH signal is transmitted in the best beam selected from a plurality of beams received during a synchronization subframe.

13. The method of claim 1, wherein each attempt is made at a transmission time denoted by a combination of one or more of frame index, subframe index, or symbol index.

14. An apparatus for wireless communication, the apparatus being a user equipment (UE), comprising:
a memory; and
at least one processor coupled to the memory and configured to:
determine a number of attempts for a transmission of a random-access channel (RACH) signal based on a path loss, a transmit power of the UE, and a RACH preamble received target power; and
transmit the RACH signal in the determined number of attempts.

15. The apparatus of claim 14, wherein the UE has a beam correspondence when the UE is able to determine a transmit beam for uplink transmission of the UE based on downlink measurements on receive beams of the UE.

16. The apparatus of claim 14, wherein, to determine the number of attempts, the at least one processor is configured to:
estimate the RACH preamble received target power based on one or more of the path loss, the transmit power of the UE, or a power of signals received during a synchronization subframe, wherein the number of attempts is determined based on the path loss, the transmit power of the UE, a beam correspondence at the UE, and the RACH preamble received target power.

17. The apparatus of claim 16, wherein the determined number of attempts is one when a maximum effective isotropic radiated power (EIRP) of the UE is greater than a summation of the RACH preamble received target power, the path loss, and an offset, wherein the determined number of attempts is more than one when the maximum EIRP of the UE is less than the summation of the RACH preamble received target power, the path loss, and the offset.

18. The apparatus of claim 17, wherein a value of the offset is zero when the UE has the beam correspondence.

19. The apparatus of claim 17, wherein a value of the offset is greater than zero when the UE does not have the beam correspondence, wherein the offset is determined based on an achievable array gain of the UE.

20. The apparatus of claim 17, wherein the EIRP of the UE is defined as a summation of the transmit power of the UE and an array gain of the UE.

21. The apparatus of claim 14, wherein the path loss is determined individually for each of a plurality of beams received during a synchronization subframe.

22. The apparatus of claim 14, wherein the RACH signal is a directional RACH (DRACH) signal, wherein the DRACH signal is transmitted at a transmission time for a best beam.

23. The apparatus of claim 22, wherein the best beam denotes a beam whose corresponding reference signal, received during a synchronization subframe, is a strongest reference signal at the UE among all possible beams.

24. The apparatus of claim 22, wherein the DRACH signal is transmitted in the best beam selected from a plurality of beams received during a synchronization subframe.

25. The apparatus of claim 14, wherein each attempt is made at a transmission time denoted by a combination of one or more of frame index, subframe index, or symbol index.

* * * * *